United States Patent [19]

Iwahori et al.

[11] 4,326,960
[45] Apr. 27, 1982

[54] TUBULAR PERMSELECTIVE MEMBRANE MODULE AND METHOD

[75] Inventors: Hiroshi Iwahori; Shigetoshi Matsumoto, both of Ibaraki, Japan

[73] Assignee: Nitto Electric Industrial Company Ltd., Osaka, Japan

[21] Appl. No.: 177,843

[22] Filed: Aug. 14, 1980

[30] Foreign Application Priority Data

Aug. 14, 1979 [JP] Japan .................. 54-103780

[51] Int. Cl.³ .................. B01D 13/00; B01D 31/00
[52] U.S. Cl. .................. 210/650; 210/652; 210/243; 210/433.2
[58] Field of Search .............. 210/649, 650, 651, 652, 210/243, 321.1, 433.2; 422/48; 55/158

[56] References Cited

U.S. PATENT DOCUMENTS

| 3,186,551 | 6/1965 | Dornauf | 210/243 |
| 3,457,170 | 7/1969 | Havens | 210/321.1 X |
| 3,746,591 | 7/1973 | Banfield | 210/500.2 X |
| 3,870,637 | 3/1975 | Miyoshi et al. | 210/243 |

OTHER PUBLICATIONS

Sourirajan, S. "Reverse Osmosis", Academic Press, New York, 1970, p. 444.

Primary Examiner—Charles N. Hart
Assistant Examiner—David R. Sadowski
Attorney, Agent, or Firm—Armstrong, Nikaido, Marmelstein & Kubovcik

[57] ABSTRACT

Module and method for providing a safe treatment of noncondutive organic solutions containing inflammable solvents by passing such solutions under pressure through electrically conductive perforated tubes supporting membrane assemblies therein and being grounded through the case of the module.

16 Claims, 6 Drawing Figures

TUBULAR PERMSELECTIVE MEMBRANE MODULE AND METHOD

BACKGROUND OF THE INVENTION

This invention relates to a treatment of organic solutions. More particularly, it is directed to a permselective membrane module and method whereby organic solvents are recovered from the solutions and solutes are separated and concentrated, without possibility of explosion or fire resulting from electrostatic effects occurring in the module during treatment.

Apparatuses having permeable membranes therein are often used for recovery of organic solvents from solutions. When these solutions are nonconductive, static electricity may be produced due to friction between charged particles in the solution and the inner wall of tube supporting the membranes so that the apparatuses become charged with static electricity as they pass through the tube. If these organic solvents are inflammable, there is a persistent danger of explosion and/or fire. Moreover, when such organic solvents are treated by the present distillation method, environment pollution is created. Therefore, there is a pressing need for a method by which such accidents during solution-treatment can be avoided, and reduction of environmental pollution can be achieved.

The conventional apparatuses disclosed in, for example, U.S. Pat. Nos. 3,746,591 and 3,457,170 are disadvantageous in that the dangers resulting from static electricity are not considered, and therefore not overcome.

SUMMARY OF THE INVENTION

The module and method of this invention which overcome the above discussed and numerous other disadvantages and deficiencies of the prior art, relate to a module for the treatment of organic solutions comprising:

(1) a membrane assembly, (2) an electrically conductive support tube supporting the membrane assembly therein; the wall of this support tube being constructed with spaced perforations, (3) an electrically conductive cylindrical case enclosing the support tube therein and having a permeate port, (4) an electrically conductive spacer for maintaining a space between the support tube and the case, (5) headers sealing the ends of the case in a solution-tight engagement by means of packing materials; one header having an entry port, for feed of the solution, connecting to one end of the support tube and/or an exit port, for the treated solution, connecting to the other end of the support tube, and (6) a grounding means for grounding the support tube through the module elements such as the spacer, the case and the like.

After grounding the support tube, the solution is forced under a given pressure through the support tube from the entry port to the exit port, whereby the permeate collects inside the case through the perforations of the support tube and exits from the permeate port, and the residual solution exits as a concentrated solution from the exit port.

The membrane assembly and the corresponding support tube may be multiple consisting of a series of sub-elements of the support tube connected in series at the headers, the distance between the sub-elements of the support tube being maintained by the spacer. Each of the headers has, on its inner face, U-shaped-bent passages which align pairs of sub-elements of the support tube in such a manner that the solution passing through the entry port passes back and forth along all the sub-elements in turn before leaving the module through the exit port.

The membrane assembly and the corresponding support tube may be multiple consisting of sub-elements of the support tube connected in parallel at the headers, the distance between the sub-elements of the support tube being maintained by the spacer. Each of the headers has, on its inner face, multisocket-shaped-straight passages which align the sub-elements of the support tube in such a manner that the solution entering one header on the entry port side passes all the sub-elements at the same time before leaving the module through another header on the exit port side.

Thus, the invention described herein makes possible the objectives of (a) prevention of explosion and fire resulting from static electricity which is caused by friction of charged particles with the inner wall of the support tube even when the organic solvent used is inflammable, (b) separation and concentration of solutes from nonconductive organic solutions in a wide range of molecular weights, and (c) reduction of losses of solvent and valuable solutes by use of a looped system thereby minimizing environmental pollution.

BRIEF DESCRIPTION OF THE DRAWINGS

This invention may be better understood and its numerous objectives and advantages will become apparent to those skilled in the art by reference to the accompanying drawings as follows.

DESCRIPTION OF THE PREFERRED EMBODIMENTS

Figure 1:
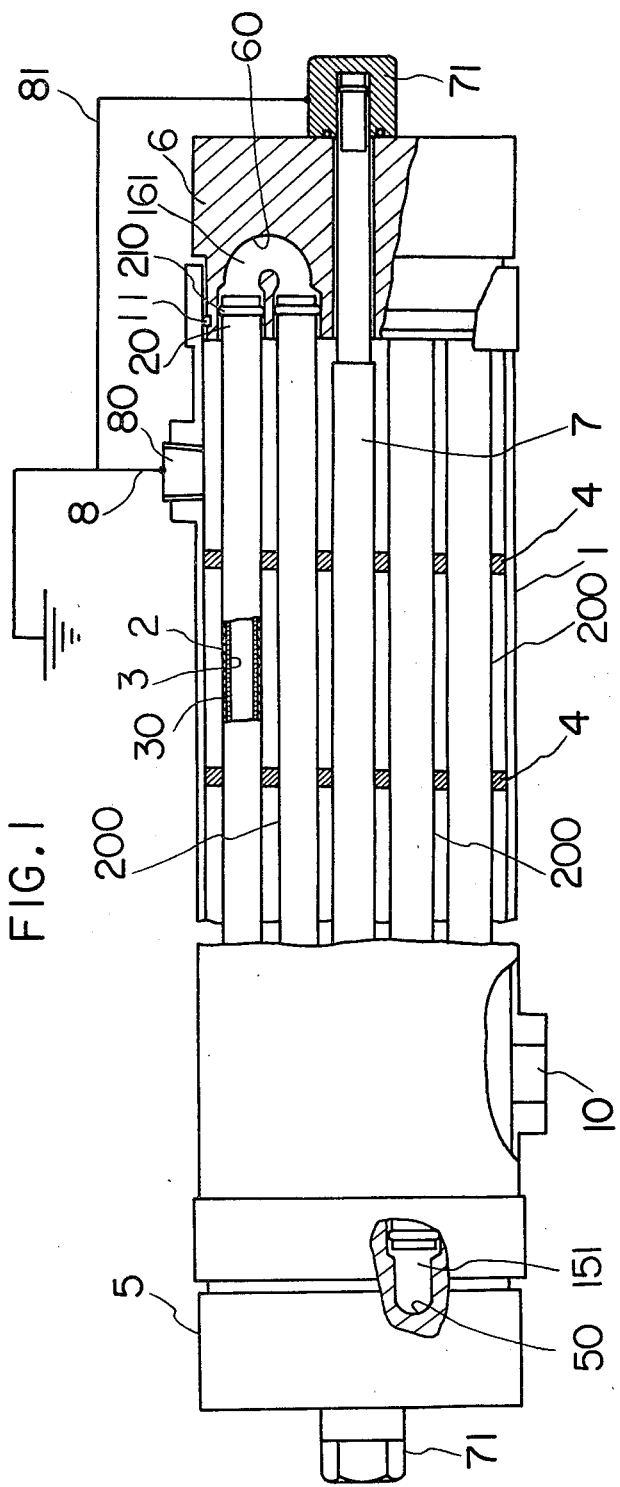
FIG. 1 is a partial sectional view illustrating the preferred tubular permselective membrane module of this invention.

The tubular permselective membrane module of this invention has an electrically conductive cylindrical case 1, a conductive support tube 2 enclosed in the case 1 and a membrane assembly 3 supported by the support tube 2, as shown in FIG. 1.

Figure 2:
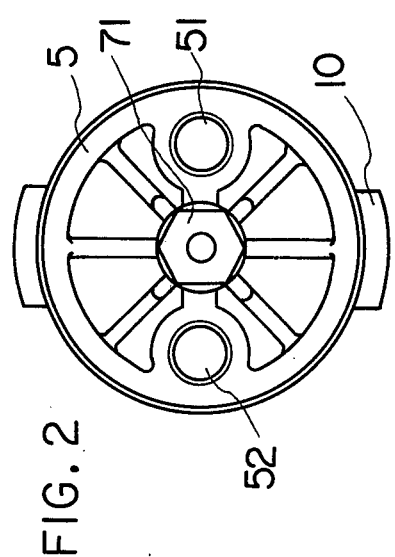
FIG. 2 is a side view of the tubular permselective membrane module of this invention.

The support tube 2, the wall of which is constructed with spaced perforations, is held in place by a conductvie spacer 4 at a given distance from the inner face of the case 1 which is in a solution-tight engagement by means of a packing material 11, within headers 5 & 6, at its each end. The header 5 has an entry port 51 for feed-solution and an exit port 52 for the treated solution as shown in FIG. 2. The entry port 51 connects to one end of the support tube 2 and the exit port 52 connects to the other end of the support tube 2. The perforations of the support tube wall allow solvents to flow to a permeate port 10 of case 1.

Figure 3:
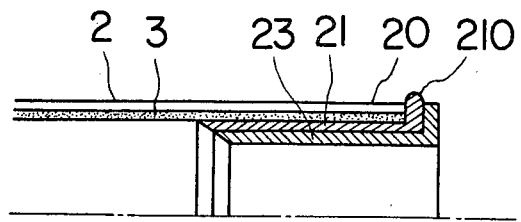
FIG. 3 is a partially enlarged sectional view of the support tube of this invention.

The membrane assembly 3 has a porous ply 30 on its outer face. The ply 30 is adjacent to the inner face of the support tube 2. Both ends of the membrane assembly 3, respectively, are sealed in a solution-tight engagement at the end 20 of the support tube 2 by means of a packing material 21 which is supported by a conductive supporting means 23, as shown in FIG. 3. The top end 210 of the packing material 21 forms an O-shaped ring between the support tube 2 and the supporting means 23 in such a manner that the top end 210 protrudes outward from the rim of the end 20 of the support tube 2.

The membrane assembly 3 and the corresponding support tube 2 may be multiple consisting of a series of sub-elements 200 of the support tube 2 connected in series at the headers 5 & 6, the distance between the sub-elements of the support tube 2 being maintained by the spacers 4, one of which must be conductive. Each of the headers 5 & 6 has, on its inner face 50 & 60, U-shaped-bend passages 151 & 161, which align pairs of sub-elements 200 of the support tube 2 in a series in such a manner that the solution entering the entry port 51 passes back and forth along all the sub-elements 200 in turn, before leaving the module through the exit port 52. The end 20 of the support tube 2 is connected to the inner face of the U-shaped passages 151 & 161 in a solution-tight engagement by means of the O-shaped ring 210.

The membrane assembly 3 and the corresponding support tube 2 may be multiple consisting of sub-elements of the support tube connected in parallel at the headers, the distance between the sub-elements of the support tube also being maintained by the spacer. Each of the headers 5 & 6 has, on its inner face, multisocket-shaped-straight passages 162 which align the sub-elements of the support tube in such a manner that the solution entering one header 5 on the entry port side passes all the sub-elements at the same time before leaving the module through another header 6 on the exit port side, as shown in FIG. 4(b). The end 20 of the support tube 2 is also connected to the inner face of the multisocket-shaped-straight passages 162 in a solution-tight engagement by means of the O-shaped ring 210.

The headers 5 & 6 are coupled to each end of the case 1 by means of a conductive stay bolt 7 running from one header 5 to the other 6. The stay bolt 7 locks the unit of the case 1 and the headers 5 & 6 by means of nuts 71.

The support tube 2 is grounded by a grounding means comprising the spacer 4, the case 1 and the stay bolt 7. The grounding means may further comprise a wire 8 connected to the case 1 with a detachable plug 80 on the surface of the case 1. For completed grounding of the module, the wire 8 may be connected to another wire 81 from the stay bolt 7.

Figure 4A:
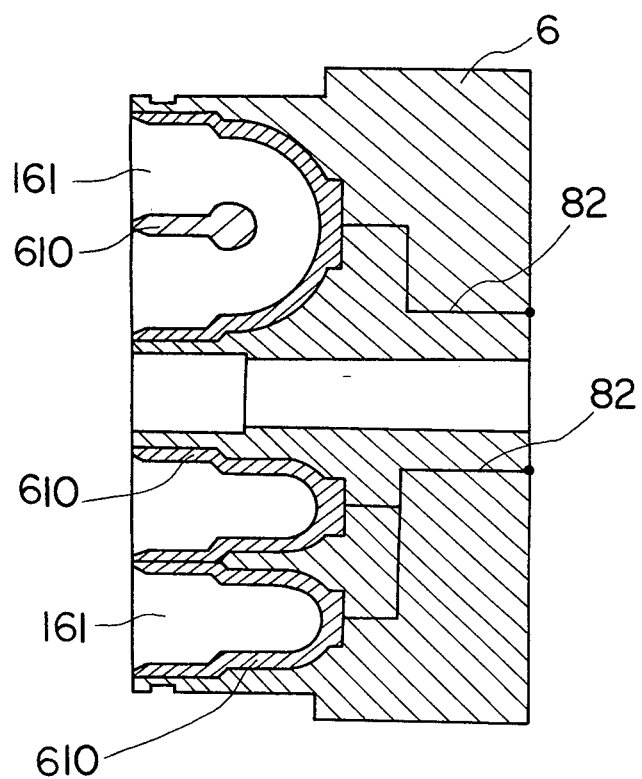
FIG. 4(a) is an enlarged sectional view of a header applicable to this invention.
Figure 4:
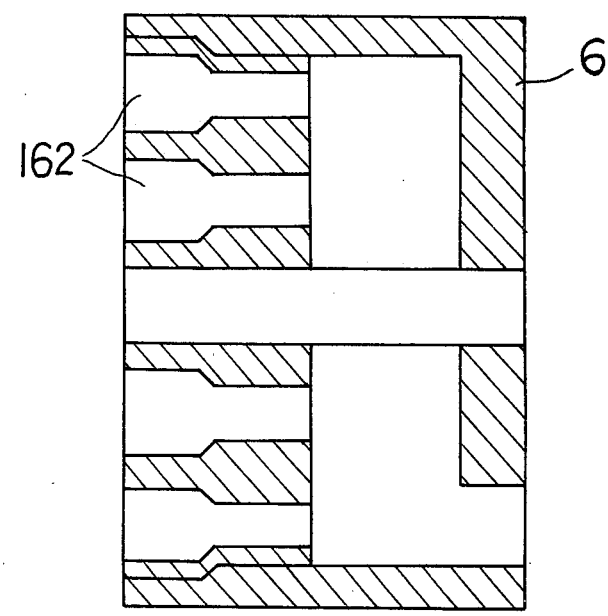
FIG. 4(b) is an enlarged sectional view of another header applicable to this invention.

The U-shaped-bend passages 151 & 161 in the inner faces 50 & 60 of the headers 5 & 6 may be of a metal and molded within the headers 5 & 6. Since the headers 5 & 6 are of plastic such as glass-reinforced nylon, the metallic walls 610 of the passages 151 & 161 must be grounded to the exterior of the module, preferably by means of wires 82, as shown in FIG. 4(a), which are connected to the stay bolt 7. When the headers 5 & 6 are made from conductive plastics such as carbon powder-filled plastics or metallic powder-filled plastics, the wires 82 may be optional.

Both the U-shaped-bend passages and the multisocket-shaped-straight passages may be of a metal or a conductive resin.

The conductive elements such as the case 1, the support tube 2, the spacer 4, the stay bolt 7, the supporting means 23 and the like may be of metallic materials such as stainless steel, cast iron, carbon steel, bronze, aluminum and the like, and conductive plastics such as carbon-fiber-reinforced plastics, metallic-fiber-reinforced plastics, carbon powder-filled plastics, metallic powder-filled plastics and the like.

The membrane used is a reverse osmosis membrane, an ultrafiltration membrane or a microfiltration membrane, and its pore size ranges from about 50 Å to about 5μ.

The membrane materials prepared from synthetic resins such as polyimide, polyamidimide, polyamide and polytetrafluoroethylene, have a resistance to organic solvents and are neither swelling nor soluble in such organic solvents.

Figure 5:
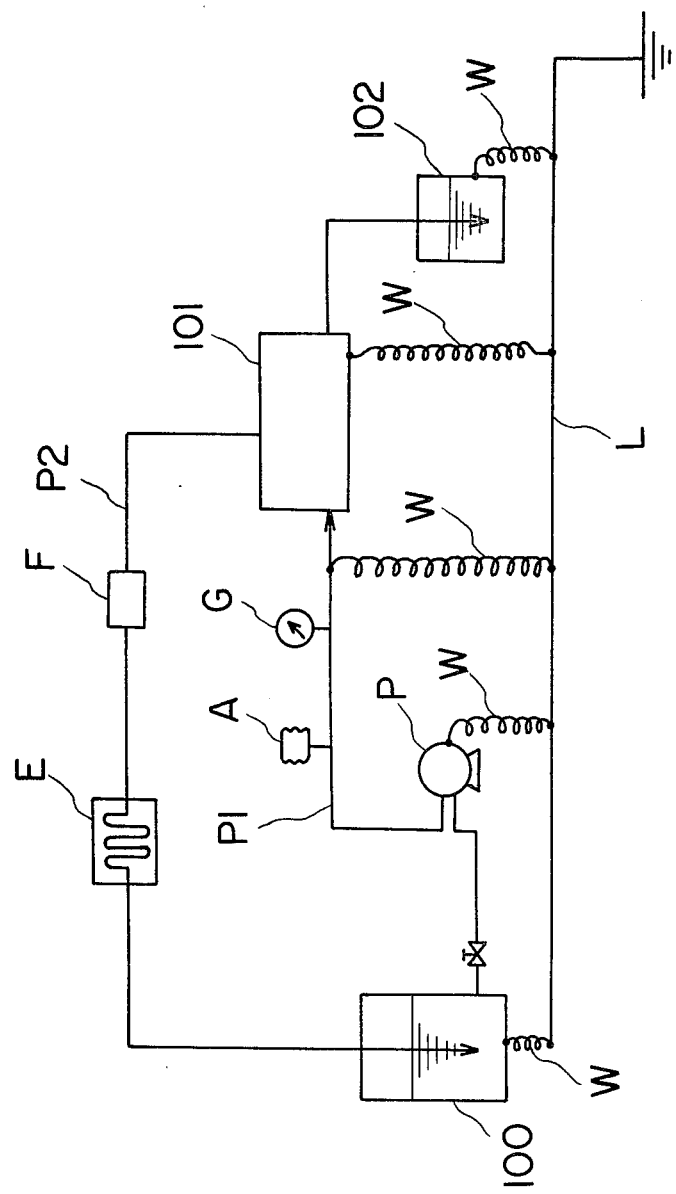
FIG. 5 is a flow sheet showing a process of the solution-treatment according to this invention.

FIG. 5 shows the process of solution-treatment by means of the module of this invention. The feed-solution to be treated is introduced from a feed-solution tank 100 to the module 101 through a feed-solution feed-pipe P1 containing a high pressure pump P, an accumulator A and a pressure gauge G. The feed-solution enters the module 101 at the entry port 51 and passes under pressure through the support tube 2 from the entry port 51 to the exit port 52. The permeate collects inside the case 1 through the perforations of the support tube 2 and exits from the permeate port 10, and then, flows to a permeate tank 102. The residual solution exits as a concentrated solution from the exit port 52 of the module 101 and flows to the feed-solution tank 100 through a return pipe P2 containing a flow meter F and a heat-exchanger E. The feed-solution tank 100, the pipes P1 & P2, the pump P, the module 101 and the permeate tank 102, respectively, are connected, in advance, to a grounding line L through wires W.

The feed-solution used may be organic solutions of paint, ink, gum or plastic paint and edible oils and the like; solutions containing a large amount of inflammable solvents such as benzene, toluene, hexane, acetone and the like. The tanks 100 & 102 and the pipes P1 & P2 may be made of stainless steel.

EXAMPLE

Dimensions of the module used for organic solution treatment were as follows:

The length (distance between the headers 5 & 6) is 1322 mm; the outer diameter of the case 1 is 108 mm; the outer diameter of the headers 5 & 6 are 109 mm; the number of sub-elements 200 of the support tube 2 is 18; the outer diameter of the support tube 2 is 15 mm; the membrane area is $0.77^2$m; the volume of the module 101 is 2.5 liters; the weight of the module is 20 Kg; the inner diameter of each port 10, 51 & 52 is 12.7 mm. The membrane was NTU-4220, a code of the membrane, which was prepared from a synthesized high polymer of the polyimide derivative. Using such a looped system as shown in FIG. 5, a toluene solution containing 1% of polybutylacrylate(molecular weight: about 200,000) was treated by the module with a flow of 20 liters/min. at a temperature of 30° C. under a pressure of 8 Kg/cm$^2$. The permeate obtained was 0.76 m$^3$/m$^2$.day and the nonvolatile matter was 0.08% of the permeate. The system was not charged with static electricity. On the other hand, it was observed that when an isolation board is mounted on the spacer, the system was charged with a static electricity of $4 \times 10^{-3}$ C/cm$^2$ Or 6,000 V on the perforated tube made of stainless steel.

We claim:

1. A tubular permselective membrane module for use in the concentration of solutions of solutes in non-conductive and inflammable organic solvents, the module of which comprises:
   (1) a membrane assembly, said membrane being resistant to said organic solvents and being a reverse osmosis membrane, an ultrafiltration membrane or a microfiltration membrane,
   (2) an electrically conductive support tube supporting said membrane assembly therein; the wall of said support tube being constructed with spaced perforations,
   (3) an electrically conductive cylindrical case enclosing said support tube therein and having a permeate port,
   (4) an electrically conductive spacer maintaining the space between said support tube and said case,
   (5) electrically conductive headers sealing the ends of said case in a solution-tight engagement by means of packing materials; one of said headers having at least one of an entry port for feed-solution connected to one end of said support tube and an exit port for the treated solution connected to the other end of said support tube,
   (6) an electrically conductive stay-bolt locking said case and said headers by means of nuts, and
   (7) a grounding means for grounding said support tube through electrically conductive elements of said module.

2. A tubular permselective membrane module, according to claim 1, wherein said membrane assembly has an porous ply on its outer face; said ply being adjacent to said tube.

3. A tubular permselective membrane module, according to claim 1, wherein both ends of said membrane assembly, respectively, are sealed in a solution-tight engagement at the end of said support tube by means of a packing material supported by a supporting means.

4. A tubular permselective membrane module, according to claim 1, wherein said support tube is multiple consisting of a series of sub-elements of the support tube connected in series at said headers, the distance between the sub-elements of said support tube being maintained by said spacer.

5. A tubular permselective membrane module, according to claim 4, wherein each of said headers has, on its inner face, U-shaped-bend passages which align pairs of sub-elements of the support tube in a series in such a manner that said solution entering said entry port passes back and forth along all the subelements of the support tube in turn, before leaving said module through said exit port.

6. A tubular permselective membrane module, according to claim 3 or 5, wherein a portion of said packing material forms an O-shaped ring between said support tube and said supporting means in such a manner that said portion protrudes outwardly from the rim of the end of said support tube and forms a solution-tight engagement between said support tube and said U-shaped-bend passage.

7. A tubular permselective membrane module, according to claim 5, wherein said U-shaped-bend passages are of a metal or a conductive resin.

8. A tubular permselective membrane module, according to claim 1, wherein said support tube is multiple consisting of sub-elements of the support tube connected in parallel at said headers, the distance between the sub-elements of said support tube being maintained by said spacer.

9. A tubular permselective membrane module, according to claim 8, wherein each of said headers has, on its inner face, multisocket-shaped-straight passages which align multiple sub-elements of the support tube in parallel in such a manner that said solution entering one entry header passes all the sub-elements of the support tube at the same time, before leaving said module through another exit header.

10. A tubular permselective membrane module, according to claim 3 or 9, wherein a top end of said packing material forms an O-shaped ring between said support tube and said supporting means in such a manner that the top end protrudes outward from the rim of the end of said support tube; said O-shaped ring forming a solution-tight engagement between said support tube and said multisocket-shaped-straight passage.

11. A tubular permselective membrane module, according to claim 9, wherein said multisocket-shaped straight passages are of a metal or a conductive resin.

12. A tubular permselective membrane module, according to claim 1, wherein said support tube, spacer and case are stainless steel, cast iron, carbon steel, bronze, aluminum, carbon-fiber-reinforced plastices, metallic-fiber-reinforced plastics, carbon powder-filled resin or metallic powder-filled resin.

13. A tubular permselective membrane module according to claim 1 wherein said spacer is positioned a given distance from an inner face of said case.

14. A method for the treatment of a solution of a solute in an organic solvent to achieve concentration thereof, comprising:
   (1) grounding an electrically conductive support tube for supporting a membrane assembly therein; said support tube having spaced perforations in its wall, said membrane being resistant to said organic solvent and being a reverse osmosis membrane, an ultrafiltration membrane or a microfiltration membrane, said grounding being achieved through electrically conductive elements including (a) an electrically conductive cylindrical case; said case being sealed in a solution-tight engagement within electrically conductive headers at each of its ends and having entry and exit ports between which said support tube extends, and a permeate port, (b) an electrically conductive spacer maintaining the space between said support tube and said case, (c) said electrically conductive headers and (d) an electrically conductive stay bolt locking said case and said headers by means of nuts, and
   (2) passing said solution under a given pressure through said support tube from the entry port to the exit port, whereby the permeate collects inside said case through the perforations of said support tube and exits from said permeate port, and the residual solution exits as a concentrated solution from said exit port.

15. A method, according to claim 14, wherein said permeate is an inflammable solvent.

16. A method according to claim 14 wherein said spacer is positioned a given distance from an inner face of said case.

* * * * *